Patented Dec. 10, 1929

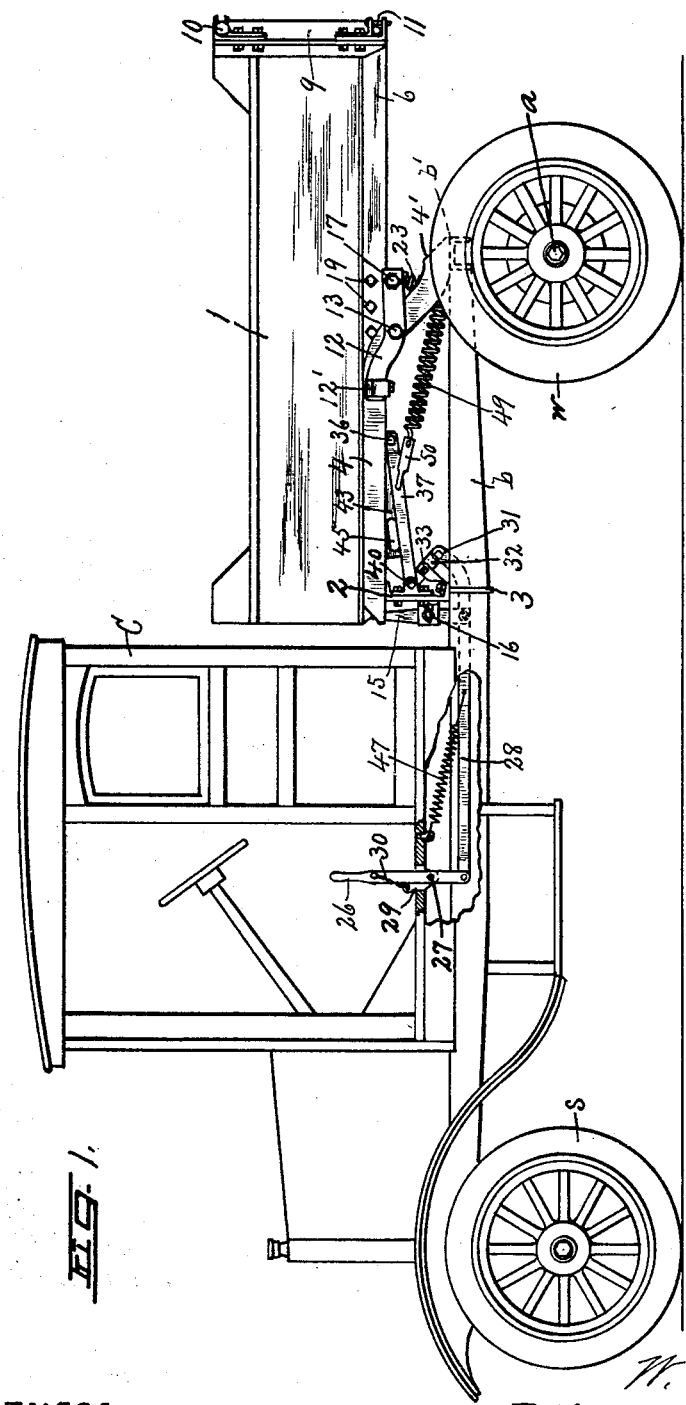

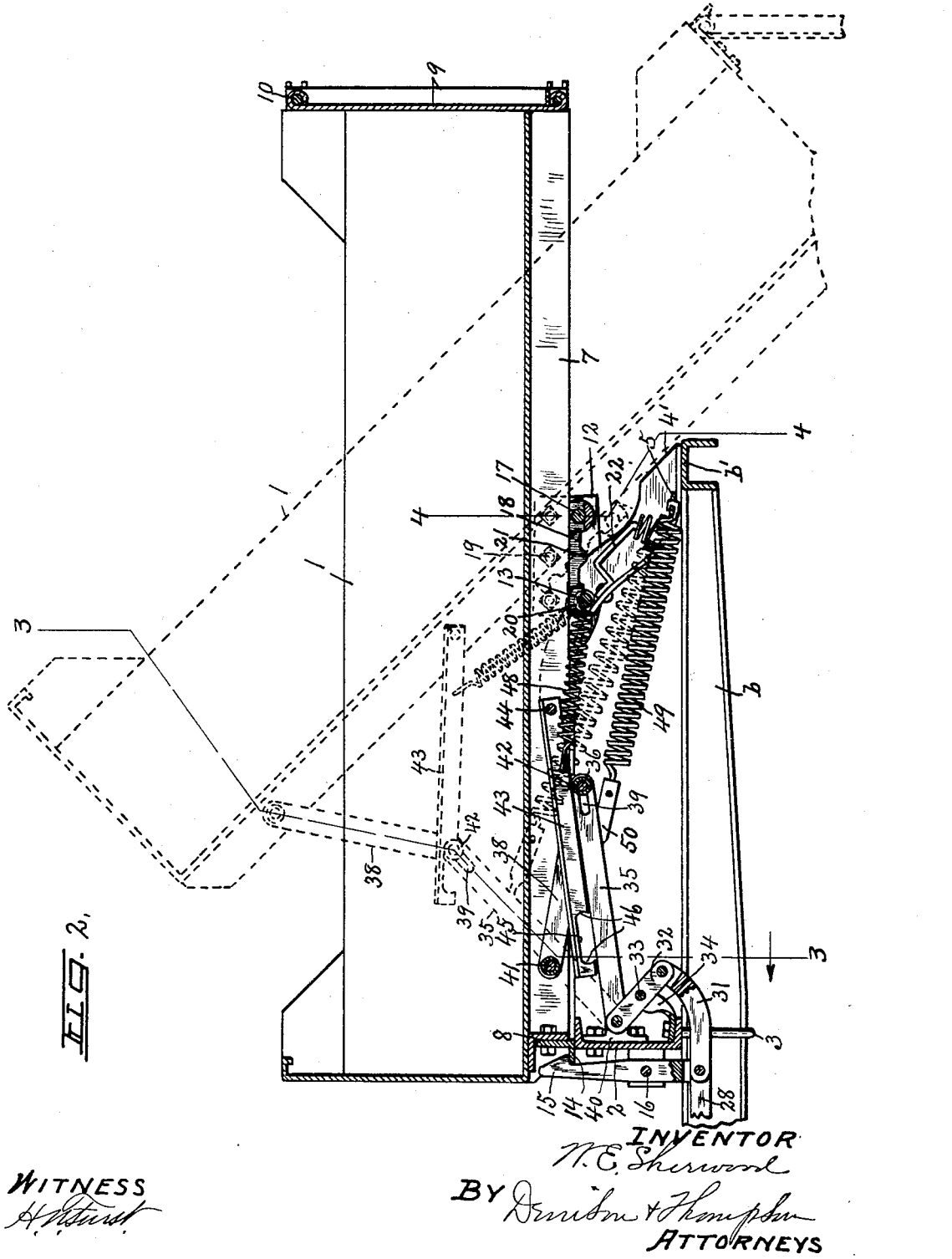

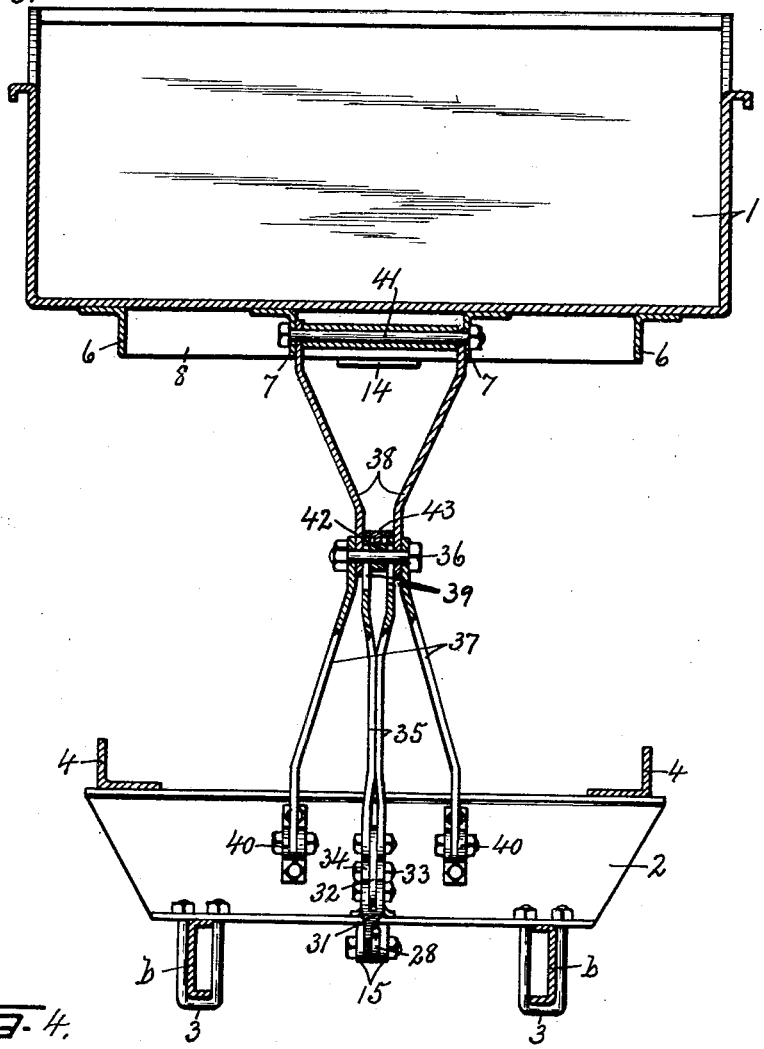
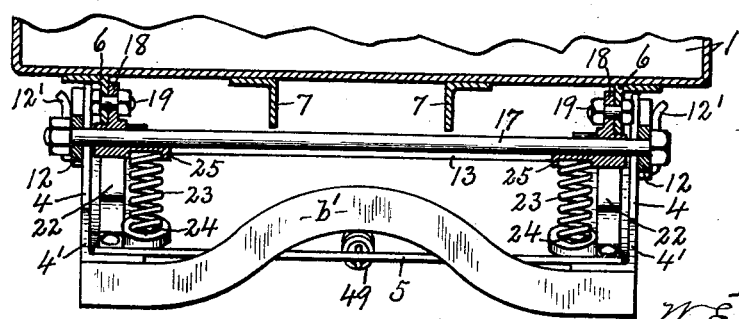

1,739,376

UNITED STATES PATENT OFFICE

WILLIAM E. SHERWOOD, OF CANASTOTA, NEW YORK, ASSIGNOR TO EAGLE WAGON WORKS, OF AUBURN, NEW YORK, A CORPORATION OF NEW YORK

REAR-END DUMP BOX FOR VEHICLES

Application filed April 23, 1925. Serial No. 25,262.

This invention relates to a rear end dump box for vehicles adapted to be used more particularly on motor trucks at the rear of the driver's cab and directly over the rear axle.

The main object is to support the box in such manner that when loaded and temporarily locked in a substantially horizontal position by means controlled from the driver's seat the release of the locking means will cause the rear end of the box to automatically tilt downwardly and rearwardly for discharging the load.

Another object is to support the box in such manner that when the load is discharged and the vehicle drawn clear therefrom the box will automatically return to its horizontal position ready for reloading.

A further object is to control these movements of the box entirely from the driver's seat and thereby to reduce the cost and greatly expedite the work of hauling loads from place to place and discharging the same at the rear of the vehicle out of the way of the wheels while the vehicle is moving forwardly.

Other objects and uses relating to specific parts of the box-supporting and controlling mechanisms will be brought out in the following descriptions.

In the drawings:

Figure 1 is a side elevation, partly in section, of a motor truck equipped with my improved dump box which is shown in its normal horizontal position for loading.

Figure 2 is an enlarged longitudinal vertical sectional view of the box and its supporting mechanism together with the adjacent underlying portion of the chassis frame, the dotted lines indicating the dumping position of the box and portions of the mechanism for controlling the movements of the box.

Figure 3 is a transverse vertical sectional view taken in the plane of line 3—3, Figure 2, with the box in its dumping position.

Figure 4 is a transverse vertical sectional view taken in the plane of line 4—4, Figure 2, with the box in its horizontal loading position.

As illustrated, the dump box as —1— is mounted upon the chassis of a motor truck at the rear of the driver's cab —C— and directly over the rear axle as —a— which carries the rear traction wheels as —w— and is connected by a suitable chassis frame to the front axle carrying the usual steering wheels —s—.

The chassis frame includes opposite lengthwise channel bars —b— arranged in transversely spaced relation and connected at their rear ends by a transverse channel bar —b'— which is preferably supported directly over the rear axle through the medium of body springs, not shown, but commonly employed in motor trucks of this character.

An additional cross bar —2— is mounted upon the upper edges of the side rails —b— just at the rear of the cab —C— and is firmly clamped to said side rails by clips or bolts —3— for additionally bracing the side rails and also to form a convenient support for the front end of the box —1— when the latter is in its normal loading position.

A pair of angle irons —4— are secured by spot welding or otherwise to the upper faces of the cross bars —b'— and —2— lengthwise of the machine and in parallel transversely spaced relation to form additional support for the front portion of the box —1— and also to guide and to hold the box against lateral movement relatively to the chassis and particularly when loaded, the front portions of said angle bars being disposed in a horizontal plane while the rear portions are curved downwardly and rearwardly as shown more clearly in Figure 1.

The rear cross bar —b'— and adjacent ends of the side bars —4— are disposed in a horizontal plane considerably lower than the upper face of the front cross bar —2— and adjacent ends of the side bars —4—, the rear ends of said side bars terminating at the rear face of the cross bar —b'— and beveled at —4'— to permit the rear end of the box —1— to tilt downwardly and rearwardly to a sufficient angle for effectively discharging the load from the rear end thereof.

An additional cross bar —5— is bolted or otherwise secured to the lower inturned flanges of the lengthwise side bars —4— near the rear ends thereof for receiving portions of the box-operating and controlling mechanism hereinafter described.

The bottom of the box —1— is reinforced by a pair of lengthwise angle bars —6— spot welded or otherwise secured to the underside thereof in parallel transversely spaced relation corresponding to the distance between the upstanding flanges of the angle irons —4— so that when the box is in its normal horizontal position the downwardly projecting flanges of the bars —6— will overlap upon the inner faces of the upright flanges of the bars —4— to cooperate with the last-named flanges in holding the box against lateral swaying movement, particularly when loaded and also to guide the box in its tilting movements.

An additional pair of angle irons —7— are secured by spot welding or otherwise to the underside of the box —1— lengthwise thereof and in parallel transversely spaced relation substantially midway between the outer angle irons —6— for receiving portions of the box-operating mechanism, presently described, the front ends of said lengthwise bars —6— and —7— being connected to each other by a cross bar —8— which is also secured by spot welding or otherwise to the underside of the front end of the box for reinforcing and other purposes.

The rear end of the box is provided with a swinging gate or closure —9— hinged at —10— to the upper portion of the rear end of the box in such manner as to automatically close when the box is brought to a horizontal loading position and to automatically open when the rear end is tilted downwardly and rearwardly to its dumping position as shown by dotted lines in Figure 2, it being understood that suitable means, as one or more catches —11—, are provided for holding the door in its closed position when the box is loaded and that these catches may be withdrawn by hand or otherwise to release the door when the load is being dumped.

*Box balancing and controlling means*

A pair of similar relatively short levers —12— are centrally pivoted by a bolt —13— upon the side bars —4— and preferably in close proximity to the outer faces thereof for vertical rocking movement, the pivotal bolt —13— being extended transversely across the underside of the box —1— and its reinforcing rails —6— and —7— as shown more clearly in Figures 2 and 4 and being disposed substantially midway between the ends of said box as shown in Figures 1 and 2 for balancing said box in its horizontal loading position except that the weight of the rear end gate —9— causes a slight over-balancing of the box and tends to rock the rear end of the box downwardly and rearwardly when released from its horizontal loading position.

A keeper —14— is secured to the cross bar —8— on the front end of the box —1— and is adapted to be engaged by a latch lever —15— which is pivoted at —16— to the front cross bar —2— to be operated in a manner hereinafter described for locking and releasing the box in and from its horizontal position.

The rear ends of the levers —12— are connected by a cross rod —17— extending transversely of and beneath the bottom of the box —1— parallel with the rod —13—.

A pair of brackets —18— are rigidly secured by bolts —19— to the inner faces of the lengthwise reinforcing bars —6— on the underside of the box —1— and engage the lower edges of said bars to additionally hold them in fixed relation thereto, said brackets being hingedly secured at their rear ends to the cross bolt or rod —17— while their front ends are provided with concave seats —20— adapted to normally rest upon the cross rod or bolt —13— when the box is in its horizontal loading position but are adapted to be moved out of engagement with said rod —13— when the box is tilted to its dumping position as shown by dotted lines in Figure 2.

The rods —13— and —17— are spaced some distance apart, the rod —13— forming what may be termed the initial balancing fulcrum for the box while the rod —17— is farther to the rear end of the box and forms what may be termed the final dumping fulcrum of said box.

The intermediate portions of the brackets —18— are provided on their lower edges with more or less V-shaped bearings —21— substantially midway between the rods —13— and —17— and adapted to engage underlying stationary bearings —22— on the adjacent side bars —4— and forming what may be termed an intermediate tilting fulcrum for the box.

The purpose of these three fulcrums is to facilitate the automatic balancing of the loaded box when in a horizontal position and the automatic tilting of the loaded box to its dumping position in a manner presently described.

For example, when the box is loaded and disposed in a horizontal position the weight may be more or less evenly distributed throughout the length of the box or at the front and rear of the fulcrum bolt —13—, the loaded box being operatively held in this position by the latch —15—, but immediately upon the release of the latch, if the load at the front and rear of the initial fulcrum bolt —13— is substantially balanced, a slight upward movement of the front end of the box or corresponding downward movement of the rear end of the box in case the load is overbalanced at the rear will cause the box to first rock about the axis of the fulcrum bolt —13—.

Then, as the box continues to tilt toward its dumping position the bearings —21— will next be brought into engagement with the underlying bearings —22— which forms the intermediate fulcrum about which the box continues to rock until the rear ends of the brackets —18— engage the underlying bearings —22— at lower points thereof farther to the rear as shown by dotted lines in Figure 2 thereby limiting the further movement of the levers —12— and permitting the box to continue its dumping movement about the rod —17— until stopped by its engagement with the buffers —23— and shoulders —4'—.

This downward movement of the rear ends of the brackets —18— and bolt —17— carried thereby causes a corresponding rocking movement of the rear ends of the levers —12— which are connected to said bolt as previously explained.

This shifting of the fulcrum of the box rearwardly beyond the center thereof when in its dumping position brings the greater part of the load of the empty box to the front of the fulcrum bolt —17— and causes said box to automatically return to its horizontal position as soon as its rear end is withdrawn from the dumped load.

This return movement of the empty box to its horizontal position is facilitated by coiled springs —23— which are interposed between suitable seats —24— on the frame bars —4— and opposed seats —25— on the brackets —18—, Figure 4, said springs also serving as buffers to relieve the shock upon the frame of the machine when the box approaches the limit of its dumping position, it being understood that under the latter conditions the springs —23— will be placed under more or less compression and will impart to the box an initial impetus toward its return.

The latch —15— and other parts of the box-controlling mechanism are preferably operated from the cab of the truck and, for this purpose, is provided a hand lever —26— pivoted at —27— to the floor of the driver's cab within easy reaching distance of the driver and having its lower end connected by a link —28— to the lower end of the latch —15— whereby a forward movement of the upper end of the lever will release the latch from holding engagement with its keeper —14—.

A key —29— is adapted to be inserted between the front edge of the lever and corresponding wall of the opening in the floor of the cab to prevent accidental forward movement of the lever and thereby to prevent accidental release of the latch, said key being attached by a chain —30— or other fastening means to the lever to keep it within reaching distance and permitting it to be withdrawn when necessary to release the latch.

The lower end of the latch lever —15— and the adjacent end of the link —28— are connected by another link —31— to one end of a lever —32— which is pivoted intermediate its ends at —33— to a bracket —34— on the cross bar —2— and has its other end connected by a link —35— to a pivotal pin —36— at the flexing joint of a pair of toggle levers —37— and —38— as shown more clearly in Figure 3, the link —35— being connected to the pivotal pin —36— with a lost motion through the medium of a slot —39— to permit the release of the dump box from its dumping position in a manner hereinafter described, following the dumping operation.

The toggle levers —37— are pivotally connected to suitable brackets —40— on the rear face of the cross bar —2— while the toggle links —38— are pivotally connected by a bolt —41— to the lengthwise reinforcing bars —7— on the underside of the box —1— so that when the box is in its normal loading position the flexing joint of the toggle will be forced rearwardly from the brackets —40— and pivotal bolt —41— while on the other hand when the box is tilted toward its dumping position the toggle links will be moved toward a straightened position as shown by dotted lines in Figure 2 and by full lines in Fig. 3.

A roller —42— is mounted upon the pivotal pin 36 at the toggle joint of the levers —37— and —38— to roll against the underside of a latch lever —43— as the box is tilted toward its dumping position, the lever —43— being pivoted at —44— to the lengthwise bars —7— on the underside of the box some distance to the rear of the pivotal bolt —41— to extend forwardly from the pivot —44— and is provided at its forward end with a lengthwise recess —45— for receiving the roller —42— when the box is tilted to its dumping position as shown by dotted lines in Figure 2, the end walls of the slot forming shoulders —46— for limiting the lengthwise movement of the roller in the recess while the rear shoulder —46— cooperating with the roller —42— serves to hold the box in its tilted position until the latch —43— is released in the manner presently described.

Now, assuming that the box is locked in its dumping position by means of the latch lever —43— as shown by dotted lines in Figure 2 and that it is desired to return the box to its normal horizontal position, then, by shifting the upper end of the lever —26— rearwardly against the action of a light retracting spring —47—, the links —28— and —31— will be drawn forwardly thereby rocking the upper end of the lever —32— rearwardly and imparting a corresponding upward thrust to the link —35— which, by reason of its lost motion through the medium of the slot —39—, will be moved upwardly and rearwardly relatively to the link —38— and against the adjacent portion of the latch lever —43— thereby lifting the latter out of holding engagement with the roller —42— and thus permitting the rearward flexing of the toggle joint and consequent lowering of the then over-balanced front end of the box until the latter assumes a substantially horizontal position with its keeper —14— in locking engagement with the latch —15—.

The latch —43— is yieldingly held in engagement with the upper face of the roller —42— by means of a light coiled spring —48— having one end connected to the pivotal bolt —13— and its other end connected to said latch lever —43— in front of the pivot —44—.

A relatively heavy coiled spring —49— is connected at one end to the cross bar —5—, Figures 2 and 4, and has its other end connected to a pivoted arm —50— on the toggle lever —37— for flexing the toggle joint rearwardly and thereby assisting in returning the box to its horizontal loading position following the dumping operation.

The levers —12— extend forwardly from their respective pivots —13— and are adapted to enter suitable guide loops —12'— to rest upon the bottom of the loops when the box is in horizontal loading position, and thereby to cooperate with the pivotal bolts —17— to hold the box against vertical vibration when locked in its horizontal position by the catch —15—. That is, by pivotally connecting the rear ends of the levers to the box through the medium of the bolt —17— and bracket —18— and supporting the front ends of the levers in the loops —12'— any tendency toward upward movement of the horizontal box relatively to the chassis frame would be resisted by the engagement of the front ends of the levers —12— with the bottoms of the loops —12'— and pivotal bolt —13— connecting said levers to the frame bars when the front end of the box is locked in place by the latch —15— without in any way interfering with the free rearward tilting movement of the box when the latch is released.

The operation of the device will now be readily understood upon reference to the foregoing description and the accompanying drawings, but it is evident that various equivalents may be substituted for the parts described without departing from the spirit of the invention.

What I claim is:

1. In a road vehicle, a frame, a box fulcrumed on the frame to tilt rearwardly, a toggle connecting the frame and box in front of the fulcrum of said box, means for preventing the movement of the toggle to an approximately straightened position including a latch pivoted at one end to the box at the rear of the toggle to extend forwardly from its pivot and having its front end engaged with the toggle joint and provided with means cooperating therewith for holding said toggle joint against rearward flexion when the box is tilted and thereby holding the box against returning from its tilted to its loading positions.

2. In a road vehicle, a frame, a box fulcrumed on the frame to automatically tilt rearwardly from its normal loading position to a dumping position, means releasable at will for holding the box in its loading position, a link pivoted to the frame in front of the fulcrum, means actuated by the upward tilting movement of the front end of the box for rocking said link upwardly, a latch pivoted to the box in front of the fulcrum and adapted to automatically engage the link as the latter is rocked upwardly to limit the tilting movement of the box and to hold the box against returning to its loading position, and means operable at will for tripping the latch from its holding position to allow the return of said box.

3. In a road vehicle, a frame, a box fulcrumed on the frame to tilt rearwardly from its normal loading position to a dumping position, flexible connections between the front end of the frame and front end of the box having their intermediate portions adapted to move away from the fulcrum of the box as the latter is tilted rearwardly, a latch pivoted to the box in front of the fulcrum and adapted to automatically engage the intermediate portion of said connections for limiting the forward movement thereof as the box is tilted, means operable at will for tripping the latch out of engagement with said connections, and means for returning the box to its loading position.

In witness whereof I have hereunto set my hand this 8th day of April, 1925.

WILLIAM E. SHERWOOD.